(12) United States Patent
Samler

(10) Patent No.: US 7,053,329 B2
(45) Date of Patent: May 30, 2006

(54) SYSTEM AND METHOD FOR SECURING A WELDING ELECTRODE TO A WELDING TORCH

(75) Inventor: Gary R. Samler, Holmes Beach, FL (US)

(73) Assignee: Illinois Tool Works Inc., Glenview, IL (US)

( * ) Notice: Subject to any disclaimer, the term of this patent is extended or adjusted under 35 U.S.C. 154(b) by 49 days.

(21) Appl. No.: 10/729,447

(22) Filed: Dec. 5, 2003

(65) Prior Publication Data

US 2005/0121419 A1    Jun. 9, 2005

(51) Int. Cl.
*B23K 9/28* (2006.01)
(52) U.S. Cl. .......................... 219/75; 219/138
(58) Field of Classification Search ................ 219/75, 219/138, 136, 2.02, 46.1
See application file for complete search history.

(56) References Cited

U.S. PATENT DOCUMENTS

| | | | | |
|---|---|---|---|---|
| 3,794,806 A | * | 2/1974 | Klasson | 219/121.45 |
| 4,508,951 A | * | 4/1985 | Rehrig, Jr. | 219/74 |
| 4,543,461 A | * | 9/1985 | Hill | 219/75 |
| 5,556,550 A | | 9/1996 | Fyffe | 219/75 |
| 5,772,102 A | * | 6/1998 | New et al. | 228/42 |
| 6,884,958 B1 | * | 4/2005 | Samler | 219/75 |
| 2004/0050824 A1 | * | 3/2004 | Samler | 219/75 |

* cited by examiner

*Primary Examiner*—Kevin P. Kerns
(74) *Attorney, Agent, or Firm*—Fletcher Yoder

(57) ABSTRACT

A system and method for securing a welding electrode to a welding torch. The system includes a collet body having a first portion that compresses an end of a collet against a welding electrode as the collet is urged against the first portion. The collet body also includes an inner cylindrical portion that receives the compressed end of the collet and prevents the collet from expanding, thereby maintaining the collet compressed against the welding electrode. The method includes urging the collet against the first portion of the collet body to compress the end portion of the collet against the welding electrode. The method also includes urging the collet further into the collet body to dispose the end portion of the collet into the inner cylindrical portion of the collet body to prevent the end portion of the collet from expanding.

18 Claims, 5 Drawing Sheets

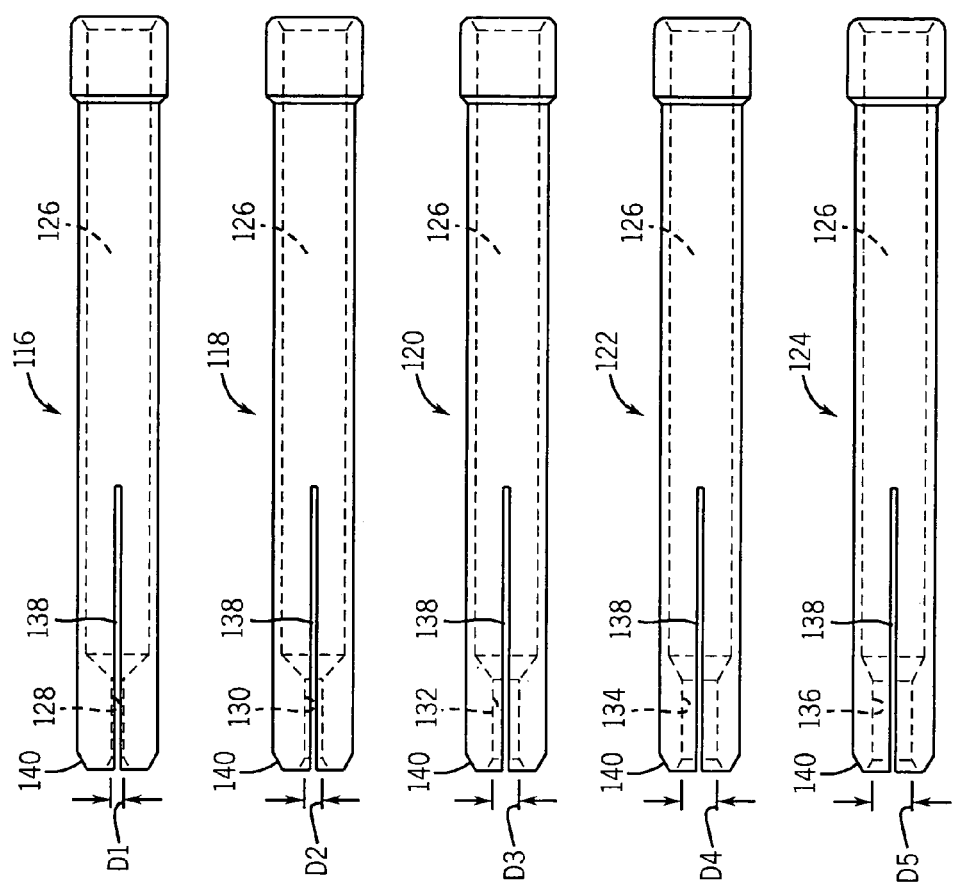

SYSTEM AND METHOD FOR SECURING A WELDING ELECTRODE TO A WELDING TORCH

BACKGROUND OF THE INVENTION

The present invention relates generally to the field of arc welding systems, and more particularly to an arc welding torch adapted to receive a cylindrical metal electrode.

TIG (Tungsten Inert Gas) welding (also known as gas tungsten arc welding, GTAW, or HELIARC) is a type of arc welding process in which an electric arc is maintained between a metal electrode and a metal object. The heat generated by the arc produces localized melting of the metal object. The electrode, typically tungsten, is secured to a torch to enable a user to direct the electrode and establish the point of contact between the electrode and the object. TIG welding may be performed with or without the addition of a filler metal. Typically, the weld puddle and the area surrounding the weld puddle are protected from the atmosphere by an inert gas. The inert gas prevents rapid oxidation of the weld and the surrounding metal.

The electricity for the welding process is provided by a power source through a welding cable coupled to the torch. Typically, the power source is a constant voltage AC, DC, or a combination AC/DC source. In addition, a TIG welding cable typically is adapted to transport the inert gas to the torch. Furthermore, the TIG welding process typically generates a substantial amount of heat in the electrode. Consequently, cooling fluid may be used to cool the torch. Thus, a welding cable for a TIG welding system may transport electricity, gas, and cooling fluid.

The metal electrodes used in TIG welding typically are shaped like long, cylindrical, metal rods. A TIG welding electrode is secured to a TIG welding torch by a collet, a backcap, and a collet body. To secure the electrode to the welding torch, the electrode is inserted through the collet and collet body. The collet body is threaded into a front portion of a threaded torch head disposed within the torch body. The backcap is threaded onto the rear portion of the torch head. As the backcap is threaded onto the torch body, the backcap drives the collet against the interior of the collet body. The collet is adapted to pinch down on the electrode as the collet is driven against an interior surface of the collet body, thereby securing the electrode to the torch. In addition, the collet body is adapted to enable gas to flow into the rear end of the collet body around the electrode and out through holes in the side of the collet body. A nozzle is used to direct the gas towards the object to be welded.

There are a number of problems associated with the use of conventional collets and collet bodies to secure an electrode to a welding torch. One problem is that the collet may be misaligned with the collet body during assembly. In addition, the welding electrode will become loose if the backcap is loosened because the surface used to hold the collet is tapered.

A need exists for a technique to enable an electrode to be installed in a welding torch more easily than with existing collets and collet bodies. More specifically, a need exists for a technique to secure an electrode to a welding torch without misalignment of the collet and collet body and to maintain the welding electrode secure even with movement of the collet relative to the collet body.

SUMMARY OF THE INVENTION

A system and method for securing a welding electrode to a welding torch. The system comprises a collet body having a first portion that compresses an end of a collet against a welding electrode as the collet is urged against the first portion. The collet body also comprises an inner cylindrical portion that receives the compressed end of the collet and prevents the collet from expanding, thereby maintaining the collet compressed against the welding electrode. The method comprises urging the collet against the first portion of the collet body to compress the end portion of the collet against the welding electrode. The method also comprises urging the collet further into the collet body to dispose the end portion of the collet into the inner cylindrical portion of the collet body to prevent the end portion of the collet from expanding and to keep the electrode concentric relative to the torch head.

BRIEF DESCRIPTION OF THE DRAWINGS

The foregoing and other advantages and features of the invention will become apparent upon reading the following detailed description and upon reference to the drawings in which:

FIG. 8 is an elevation view of a set of collets operable to cooperate with the alternative collet body of FIG. 7 to secure welding electrodes of different diameters to the welding torch, according to an exemplary embodiment of the present technique.

DETAILED DESCRIPTION OF SPECIFIC EMBODIMENTS

Figure 1:
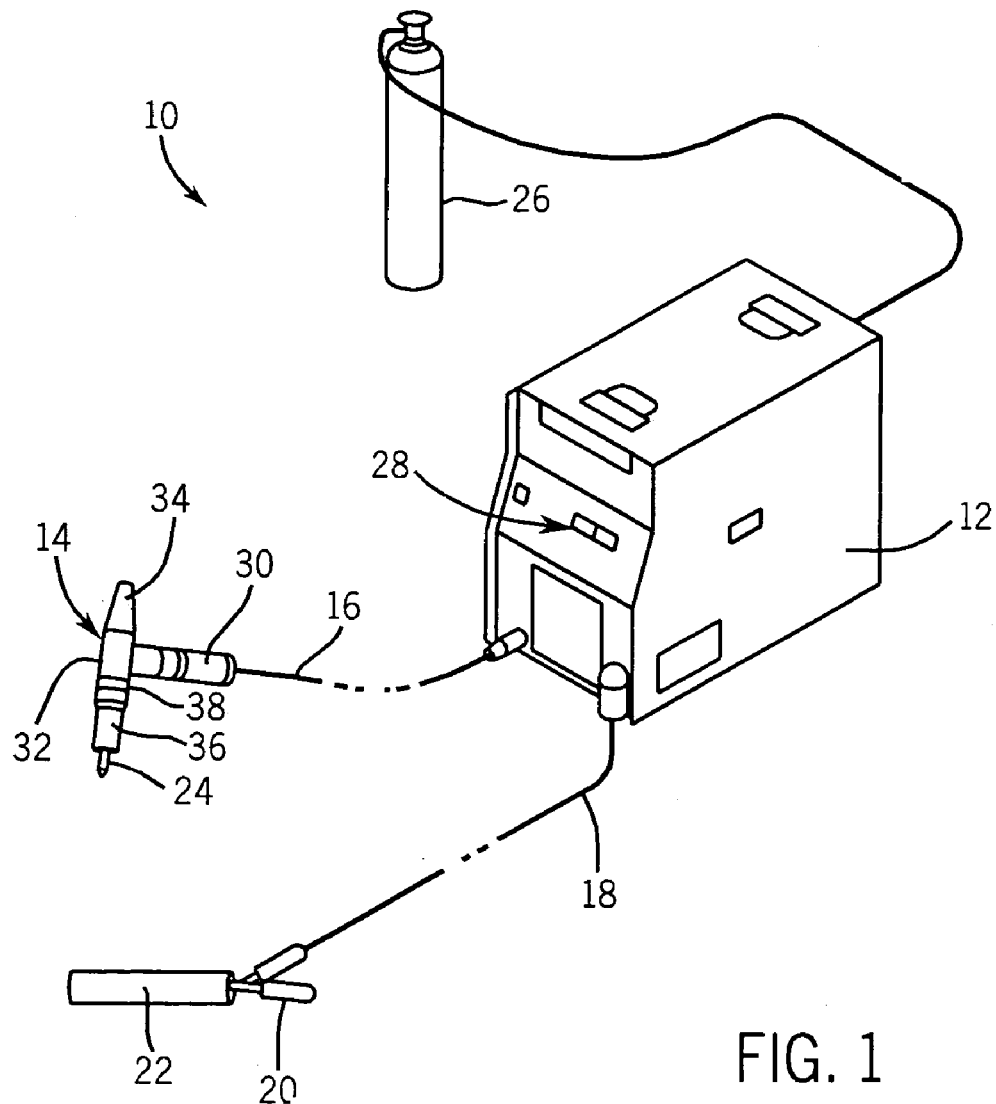
FIG. 1 is a perspective view of a welding system, according to an exemplary embodiment of the present technique.

Referring generally to FIG. 1, a TIG welding system is illustrated, as represented generally by reference numeral 10. However, the present technique may be utilized on other welding systems. The welding system 10 comprises a power supply 12, a welding torch 14, a welding cable 16, and a return cable 18. The power supply 12 may be a constant voltage AC, DC, a combination AC/DC source, or some other type of power supply. The welding cable 16 electrically couples the welding torch 14 to one terminal of the power supply 12. The return cable 18 is coupled to a second terminal of the power supply 12. In the illustrated embodiment, the return cable 18 has a clamp 20 that is adapted to secure and electrically couple the return cable 18 to a workpiece 22 to be welded. The welding torch 14 is adapted to receive an electrode 24. When the electrode 24 comes in close proximity to or touches the workpiece 22 to be welded, an electric circuit is completed from one terminal of the power supply 12, through the welding cable 16, the torch 14, the electrode 24, the workpiece 22, the work clamp 20, and the return cable 18 to a second terminal of the power supply 12.

In the illustrated embodiment, in addition to electricity, gas from a gas source is coupled to the torch 14. In the illustrated embodiment, the gas source is a gas cylinder 26 coupled to the power supply 12. In the illustrated embodiment, the gas is coupled from the power supply 12 to the torch 14 through the welding cable 16. In this embodiment, the power supply 12 has numerous controls 28 to enable a user to control various operating parameters of the power supply 12, such as the output amperage.

In the illustrated embodiment, the welding torch 14 has a handle 30 that is adapted to receive the welding cable 16. The handle 30 also is adapted to be held by a user to direct the operation of the torch 14. The welding torch 14 also has a torch body 32 that is adapted to hold the electrode 24 and direct the inert gas towards the workpiece 22. In this embodiment, the torch 14 also has a backcap 34 to seal the end of the torch body 32 opposite the electrode so that the gas does not leak out of the torch body 32. Various lengths of back caps may be used to enable the torch body to receive electrodes of various lengths. In addition, a nozzle 36 is secured to the front end of the welding torch 14 to direct gas toward the workpiece 22. An insulator 38 is provided for electrical isolation of the nozzle.

Figure 2:
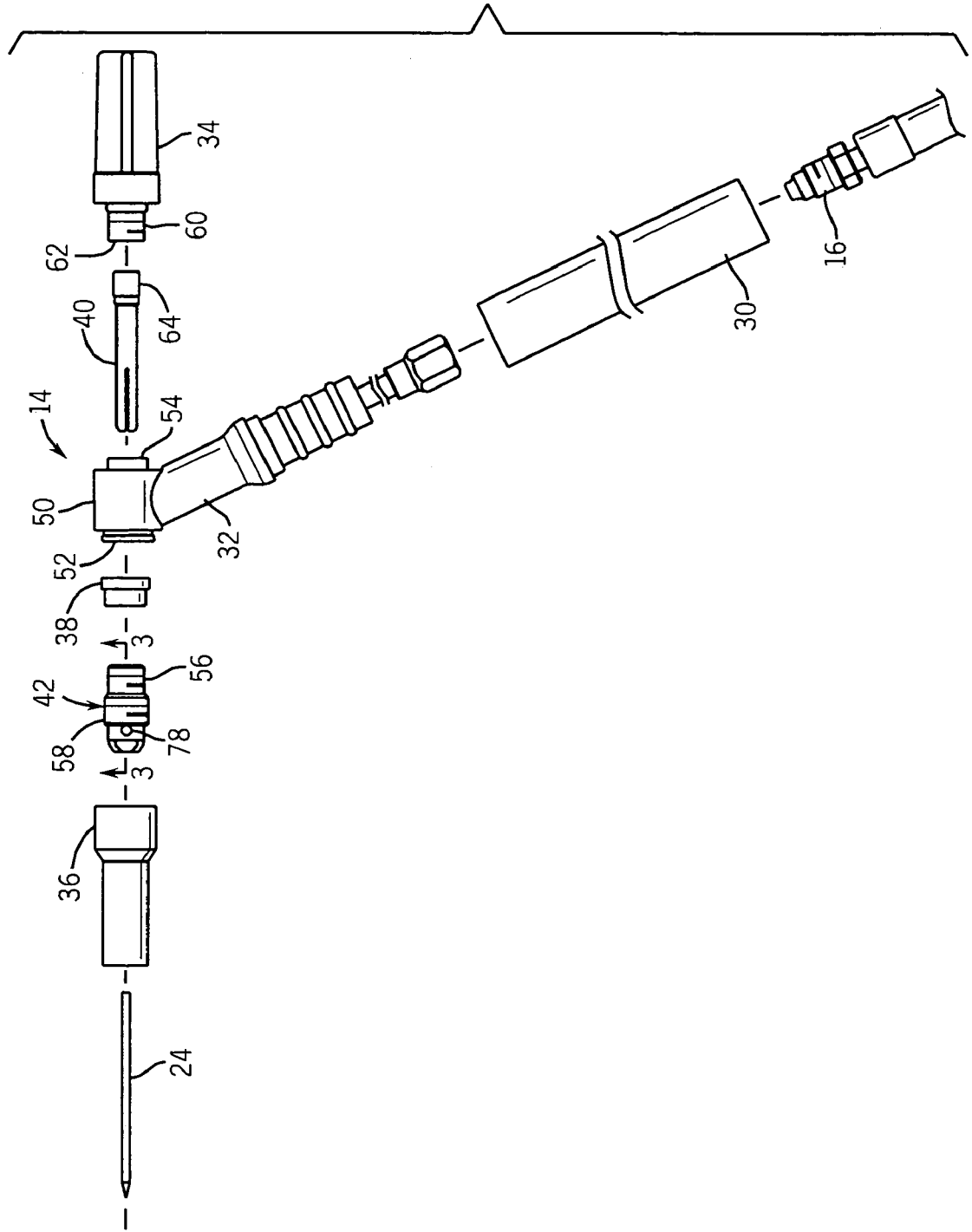
FIG. 2 is an exploded view of a welding torch, according to an exemplary embodiment of the present technique.

Referring generally to FIG. 2, an exploded view of welding torch 14 is illustrated. In the illustrated embodiment, a collet 40 and a collet body 42 are provided to secure the electrode 24 to the torch body 32. The collet 40 and collet body 42 cooperate with the backcap 34 to secure the electrode 24 to the torch body 32. The term "collet body" also refers to other hollow members used with a collet to secure a welding electrode to a welding torch, such as a gas lens body.

In the illustrated embodiment, the torch body 32 has a torch head 50. The torch head 50 has a front threaded portion 52 to secure the collet body 42 to the torch head 50 and a rear threaded portion 54 for securing the backcap 34 to the torch head 50. The collet body 42 has a first threaded outer portion 56 that is adapted for securing the collet body 42 to the front threaded portion 52 of the torch head 50. In addition, the collet body 42 has a second threaded portion 58 to enable the nozzle 36 to be secured to the collet body 42. The backcap 34 has a threaded portion 60 to enable the backcap 34 to be secured to the rear threaded portion 54 of the torch head 50.

The electrode 24 is disposed through the collet 40 and collet body 42. The backcap 34 has an interior portion 62 adapted to receive an end portion 64 of the collet 40. As will be discussed in more detail below, as the backcap 34 is threaded onto the torch head 50, the collet 40 is urged into the collet body 42, compressing the front end of the collet 40 onto the electrode 24. Different collets are used for different diameter electrodes. In addition, in prior applications, a different collet body had to be used with each different collet. However, as will be discussed in more detail below, the present technique enables a single collet body 42 to be used with a plurality of different collets to secure a plurality of different diameter electrodes to the torch head 50.

Figure 3:
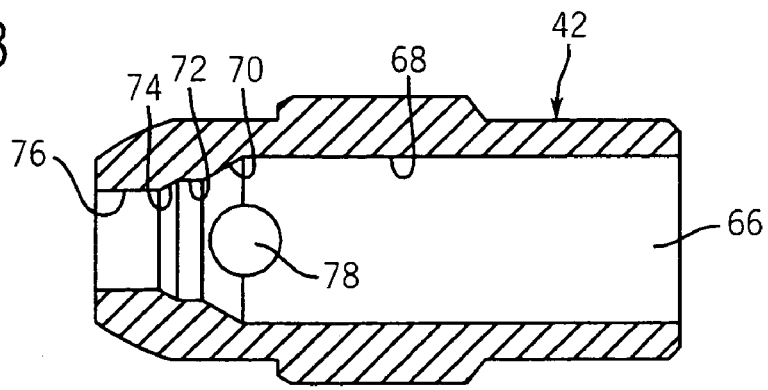
FIG. 3 is a cross-sectional view of a collet body taken generally along line 3—3 of FIG. 2.

Referring generally to FIG. 3, an embodiment of a collet body 42 is illustrated. As noted above, the collet body 42 and the collet 40 cooperate to secure a welding electrode 24 to the welding torch 32. The dimensions of a collet 40 and a collet body 42 are coordinated to facilitate their cooperation in securing the welding electrode 24 to the welding torch 32.

The collet body 42 has a passageway 66 to enable a welding electrode to extend through the collet body 42. The shape of the passageway 66 through the collet body 42 varies as it extends through the collet body 42. In the illustrated embodiment, the passageway 66 has a first cylindrical surface 68 and a first tapered surface 70 that leads to a second cylindrical surface 72. From there, the passageway 66 leads to a second tapered surface 74 and a third cylindrical surface 76. The diameter of the first cylindrical surface 68 is greater than the outer diameter of the collet to enable gas to flow through the collet body 42 from the torch body around the exterior of the collet to an opening 78 through the collet body 42. As will be discussed in more detail below, as the backcap is threaded onto the welding torch, the collet is urged against the first tapered surface 70.

In this view, the collet 40 would be inserted into the collet body 42 from the right to the left. The first tapered surface 70 of the passageway 66 compresses the end of the collet onto the welding electrode as the collet 40 is urged against the first tapered surface. As the backcap is further threaded onto the welding torch, the collet 40 is urged into the second cylindrical surface 72 of the passageway 66. The second cylindrical surface 72 prevents the compressed end of the collet from expanding, which would result in the release of the electrode. In addition, the second cylindrical surface 72 prevents the collet 40 from expanding, and thereby loosening the electrode, due to temperature changes. Furthermore, the second cylindrical surface 72 centers the collet 40 and electrode 24 within the passageway 66. As the backcap is threaded still further onto the welding torch, the collet 40 is urged against the second tapered surface 74, which provides a further compressive force on the collet 40. The third cylindrical surface 76 provides a path for the electrode 24. The end of the collet body 42 has a tapered surface 77 to guide an electrode into the collet body 42.

Figure 4:
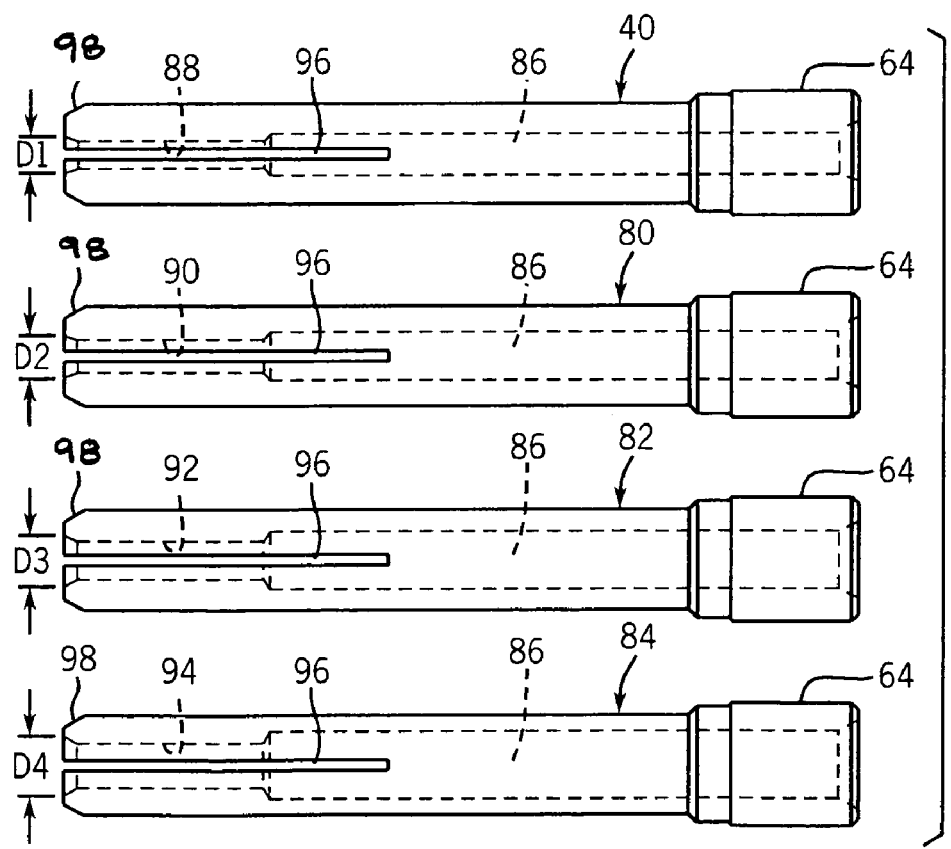
FIG. 4 is an elevation view of a set of collets operable to cooperate with the collet body of FIG. 2 to secure welding electrodes of different diameters to the welding torch, according to an exemplary embodiment of the present technique.

Referring generally to FIG. 4, a family of collets operable to cooperate with the collet body 42 to secure a family of welding electrodes of different diameters to the welding torch are illustrated. In FIG. 4, the family comprises five collets: a first collet 40, a second collet 80, a third collet 82, a fourth collet 84, and a fifth collet 85. Each of the illustrated collets is adapted to secure a welding electrode of a specific diameter to the welding torch. The collets have the same outer diameter and a passageway 86 that extends through the collet to enable an electrode 24 to extend through the collet. In addition, each passageway 86 is formed with a cylindrical gripping portion that is designed to grip an electrode of a specific diameter. The collet 40 has a gripping portion 88 that is formed with a diameter "D1". The diameter "D1" is selected to correspond to the diameter of a specified electrode. The second collet 80 has a gripping portion 90 that is formed with a second diameter, identified as "D2". Diameter "D2" is selected to be slightly larger than "D1" to enable a larger electrode to be secured to the torch. Similarly, the third collet 82 has a gripping portion 92 that has a diameter "D3", which is slightly larger than "D2", to secure a slightly larger electrode to the torch. The fourth collet 84 has a gripping portion 94 having a diameter "D4", which is slightly larger than "D3", to enable an even larger diameter electrode to be secured to the torch. Finally, the fifth collet 85 has a gripping portion 95 having a diameter "D5", which is slightly larger than "D4", to enable the largest diameter electrode to be secured to the torch. The different diameters of the gripping portions may be achieved by using different diameter drill bits to drill through a collet blank when forming the collet. Each of the collets also has a plurality of slits 96 that extend along an end portion of the collets to enable the collet to be compressed. In addition, in the illustrated embodiment, each of the collets has a tapered end surface 98 to facilitate compression of the collet 40 as the collet 40 is urged against the second tapered surface 74 of the collet body 42.

Figure 5:
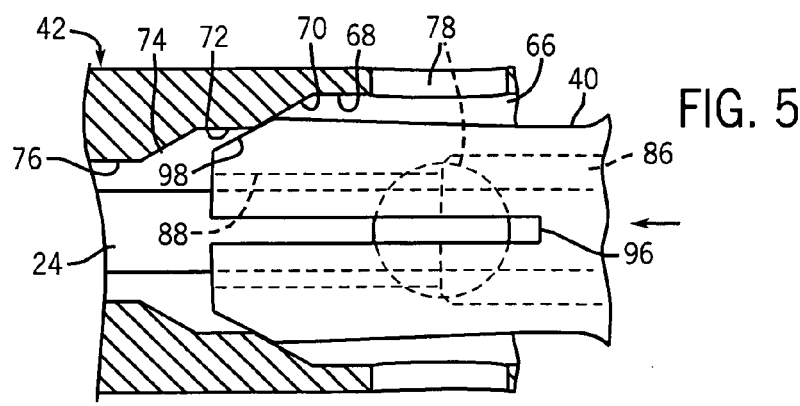
FIGS. 5 and 6 are cross-sectional views to illustrate a collet being disposed within a collet body to secure a welding electrode to the welding torch, according to an exemplary embodiment of the present technique.
Figure 6:
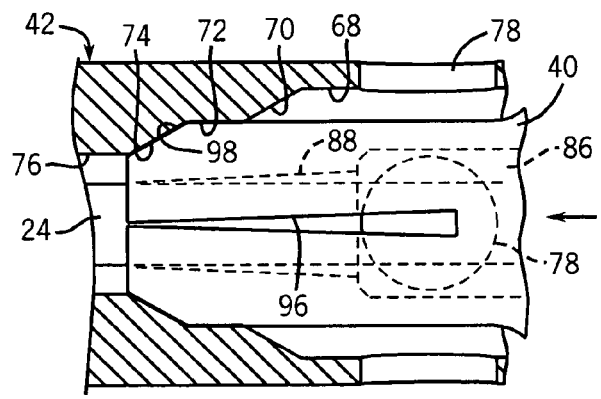

Referring generally to FIGS. 5 and 6, the electrode 24 is secured to the torch body 32 by the cooperation of the collet 40 and the collet body 42. However, as discussed above, a gas lens or a device other than the collet body 42 may be utilized in accordance with the present technique. In addition, a different collet would be used to secure a different diameter electrode to the torch body 32.

To secure an electrode 24 to the torch body, the electrode 24 is disposed through the collet body 42 and collet 40. The collet 40 is inserted into the collet body 42. The electrode 24 may be disposed through the collet 40 before or after the collet 40 is secured to the backcap 34. In addition, the electrode 24 may be disposed through the collet body 42 before or after the collet body 42 is secured to the torch head 50. As noted above, the first cylindrical portion 68 of the collet body 42 has a diameter larger than the electrode 24 to enable gas to flow around the electrode 24 through the collet body 42 to a plurality of exit holes 78.

As discussed above in reference to FIG. 2, as the backcap 34 is threaded onto the torch head 50, the collet 40 is urged towards the collet body 42. Referring again to FIGS. 5 and 6, the front end of the collet 40 is compressed when the tapered surface 98 of the collet 40 engages the first tapered surface 70 of the collet body 42, causing the gripping portion 88 of the collet 40 to grip the electrode 24. As the backcap 34 is further threaded onto the torch head 50, the end of the collet 40 is inserted inside the second cylindrical surface 72 of the passageway 66, centering the collet 40 in the collet body 42. In addition, the second cylindrical surface 72 prevents the collet 40 from expanding, thereby releasing the electrode 24.

Figure 7:
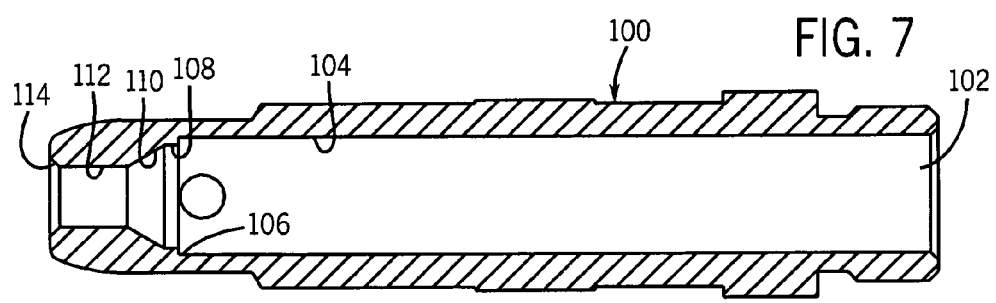
FIG. 7 is a cross-sectional view of an alternative embodiment of a collet body.

Referring generally to FIG. 7, an alternative embodiment of a collet body 100 is illustrated. The illustrated embodiment of a collet body 100 is longer than the previously disclosed embodiment of a collet body 42. The collet body 100 has a passageway 102 to enable a welding electrode to extend through the collet body 100. The shape of the passageway 102 varies as it extends through the collet body 100. In the illustrated embodiment, the passageway 102 has a first cylindrical surface 104 and a shoulder 106 extending around the passageway 102. The shoulder 106 compresses a collet as the collet is urged against the shoulder 106. The collet body 100 also has a second cylindrical surface 108 that maintains the collet compressed. The second cylindrical surface also centers the collet within the collet body 100. From there, the passageway 102 leads to a tapered surface 110 that limits movement of the collet, and assists in the compression of the collet. The collet body 100 also has a third cylindrical surface 112 to enable an electrode to extend through the collet body 100. The end of the collet body 100 has a tapered surface 114 to guide an electrode into the collet body 100.

Referring generally to FIG. 8, a second family of collets that is operable to cooperate with the collet body 100 to secure a family of welding electrodes of different diameters to the welding torch is illustrated. In FIG. 8, the family comprises five collets: a first collet 116, a second collet 118, a third collet 120, a fourth collet 122, and a fifth collet 124. As with the first family of collets described above, each of the collets in the second family of collets is adapted to secure a welding electrode of a different diameter to the welding torch. All of the collets in the second family of collets have the same outer diameter.

Each collet has a passageway 126 that enables an electrode 24 to extend through the collet. In addition, each passageway 126 is formed with a cylindrical gripping portion that is designed to grip an electrode of a different diameter. The gripping portions increase in diameter from the first collet 116 to the fifth collet 124. The first collet 116 has a gripping portion 128 and the second collet 118 has a gripping portion 130 that is larger in diameter than the gripping portion 128 of the first collet 116. Similarly, the third collet 120 has a gripping portion 132 that is larger in diameter than the gripping portion 130 of the second collet 118. The fourth collet 122 has a gripping portion 134 that is larger in diameter than the gripping portion 132 of the third collet 120 and the fifth collet 124 has a gripping portion 136 that is greater in diameter than the gripping portion 134 of the fourth collet 122. The diameters of the gripping portions are represented in FIG. 8 from "D1" to "D5". In the illustrated embodiment, the diameters "D1" through "D5" of the second family of collets correspond to diameters "D1" through "D5" of the first family of collets.

Each of the collets also has a plurality of slits 138 that extend along an end portion of the collets to enable the collet to be compressed. In addition, in the illustrated embodiment, each of the collets has a tapered end surface 140 to facilitate compression of the collet against the tapered surface 110 of the collet body 100.

Figure 9:
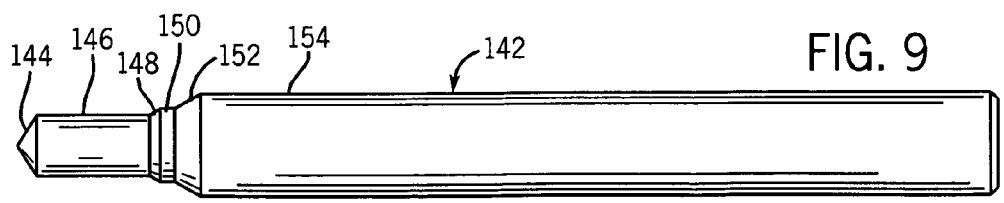
FIG. 9 is an elevation view of a two-step drill bit used to form the interior surfaces of the collet body of FIGS. 2 and 3.

Referring generally to FIG. 9, a drill bit 142 that may be used to form the passageway 66 through the collet body 42 is illustrated. The drill bit 142 is used to drill the passageway 66 through a solid collet body blank. The drill bit 142 is shaped to produce the desired surface variations in the shape of the passageway 66 in a single drilling motion. The illustrated drill bit 142 has point 144 and a cylindrical portion 146 located behind the point 144. The diameter of the point 144 and the cylindrical portion 146 are selected to produce the third cylindrical surface 76 in the collet body 42. Next, the drill bit 142 has a cutting surface 148 to cut the second tapered surface 74 into the collet body 42. The drill bit 142 has a second cylindrical portion 150. The diameter of the second cylindrical portion 150 is selected to produce the desired diameter of the second cylindrical portion 72 of the collet body 42. In addition, the length of the second cylindrical portion 150 is selected to produce the desired length of the second cylindrical portion 72 of the collet body 42. The drill bit 142 has a second cutting surface 152 to cut the collet body blank to form the first tapered surface 70 of the collet body 42. The drill bit 142 has a cylindrical shaft 154. The diameter of the second cutting surface 152 and the cylindrical shaft is selected to produce the desired diameter of the first cylindrical surface 68 of the passageway 66.

The techniques described above enable an electrode to be installed in a welding torch without misalignment of the collet and collet body. In addition, the collet body and collet maintain the welding electrode secure to the welding torch even with movement of the collet relative to the collet body.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of securing a welding electrode to a welding torch using a collet, comprising:
    disposing the welding electrode through a collet body;
    disposing a collet operable to receive the welding electrode therethrough into the collet body;
    urging the collet against a first portion of the collet body to compress an end portion of the collet against the welding electrode; and
    urging the collet further into the collet body to dispose the end portion of the collet into a cylindrical portion of the collet body having a diameter corresponding to the compressed end portion of the collet to prevent the end portion of the collet from expanding.

2. The method as recited in claim 1, disposing the welding electrode through the collet.

3. The method as recited in claim 1, comprising threading the collet body to the welding torch to secure the collet body to the welding torch.

4. The method as recited in claim 1, wherein urging the collet against a first portion of the collet body comprises disposing the collet within a backcap and threading the backcap to the welding torch.

5. The method as recited in claim 1, wherein urging the collet further into the collet body comprises further threading the backcap to the welding torch.

6. A collet body adapted to cooperate with a collet to secure a welding electrode to a welding torch, comprising:
    a first cylindrical inner portion having a first diameter;
    a second cylindrical inner portion having a second diameter, the second diameter being less than the first diameter, and
    a surface disposed intermediate the first and second cylindrical inner portions,
    wherein the surface is configured to compress an end of a collet having an initial outer diameter intermediate the first and second diameters to a final outer diameter less than the second diameter as the collet is disposed against the surface to enable the end of the collet to enter the second cylindrical inner portion.

7. The collet body as recited in claim 6, wherein the second cylindrical inner portion prevents the end of the collet from expanding when the end of the collet is disposed within the second cylindrical inner portion.

8. The collet body as recited in claim 6, wherein the surface is tapered from the first cylindrical inner portion to the second cylindrical inner portion.

9. The collet body as recited in claim 6, comprising a third cylindrical inner portion having a third diameter less than the second diameter.

10. The collet body as recited in claim 6, wherein the second cylindrical inner portion centers the collet within the collet body as the collet is disposed within the collet body.

11. A welding torch system, comprising:
    a first collet having an outer diameter and an inner diameter, wherein the inner diameter is configured to compress against a welding electrode having a defined diameter disposed through the first collet; and
    a collet body securable to the welding torch, the collet body comprising:
        a first inner portion configured to compress an end portion of the first collet against the welding electrode as the first collet is urged against the first inner portion; and
        a cylindrical inner portion having a diameter less than the outer diameter of the first collet, wherein the cylindrical inner portion receives the compressed end portion of the first collet as the first collet is urged further into the collet body and the cylindrical inner portion is configured to prevent the compressed end portion of the first collet from expanding.

12. The system as recited in claim 11, wherein the first collet has a tapered end surface that is configured to compress the end portion of the first collet as the collet is urged against the first inner portion.

13. The system as recited in claim 12, wherein the first inner portion is tapered.

14. The system as recited in claim 12, wherein the collet body comprises a second inner portion, the second inner portion being tapered to cooperate with the tapered end surface of the collet to limit travel of the collet relative to the collet body.

15. The system as recited in claim 11, comprising a second collet having the outer diameter of the first collet and a second inner diameter greater than the inner diameter of the first collet to enable the second collet to receive a second welding electrode having a second defined diameter greater than the defined diameter of the first collet.

16. The system as recited in claim 11, wherein the first inner portion compresses an end portion of the second collet against the second welding electrode as the second collet is urged against the first inner portion.

17. The system as recited in claim 16, wherein the cylindrical inner portion of the collet body receives the compressed end portion of the second collet as the second collet is urged further into the collet body and the cylindrical inner portion is configured to prevent the compressed end portion of the second collet from expanding.

18. The system as recited in claim 11, comprising the welding electrode.

* * * * *